United States Patent Office 3,007,937
Patented Nov. 7, 1961

3,007,937
SYNTHESIS OF 5-(4-AMINOBUTYL)
HYDANTOIN
Arthur O. Rogers, Lewiston, N.Y., assignor to E. I. du Pont de Nemours and Company, Wilmington, Del., a corporation of Delaware
No Drawing. Filed June 4, 1959, Ser. No. 817,978
8 Claims. (Cl. 260—309.5)

This invention relates to the production of 5-(4-aminobutyl)-hydantoin which is a valuable lysine intermediate. It also relates to 5-phthalimidovaleraldehyde semicarbazone, its production and its use in preparing 5-(4-aminobutyl)-hydantoin.

My copending application Ser. No. 818,002, filed of even date herewith, discloses the preparation of 5-chloro- and 5-bromovaleraldehyde semicarbazones by hydrogenating the corresponding halovaleronitrile in the presence of semicarbazide and a hydrogenation catalyst such as Raney nickel. It is an object of the present invention to provide a method for converting 5-chloro- or 5-bromovaleraldehyde semicarbazone to 5-phthalimidovaleraldehyde semicarbazone, which is a new compound. A further object of the invention is a method for converting this new compound to 5-(4-aminobutyl)-hydantoin. Still further objects will be apparent from the following description.

The objects of the invention are realized by the provision of 5-phthalimidovaleraldehyde semicarbazone and by its preparation by reacting 5-chloro- or 5-bromovaleraldehyde semicarbazone with a salt of phthalimide. In a further embodiment of the invention, the phthalimidovaleraldehyde semicarbazone intermediate is reacted with hydrogen cyanide and water to obtain the valuable lysine intermediate, 5-(4-aminobutyl)-hydantoin.

The reaction to produce the phthalimidovaleraldehyde semicarbazone intermediate can be represented as follows, using the chlorovaleraldehyde semicarbazone as illustrative:

(1)
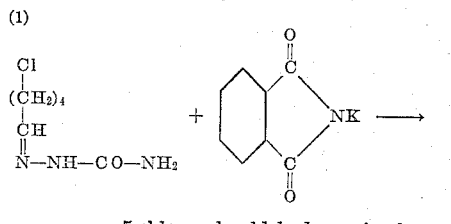

5-chlorovaleraldehyde semicarbazone

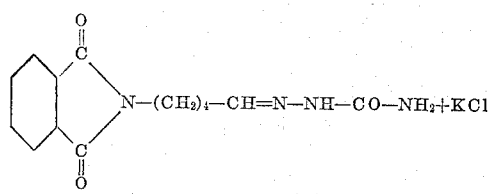

5-phthalimidovaleraldehyde semicarbazone

The reaction to produce 5-(4-aminobutyl)-hydantoin can be represented as follows:

(2)
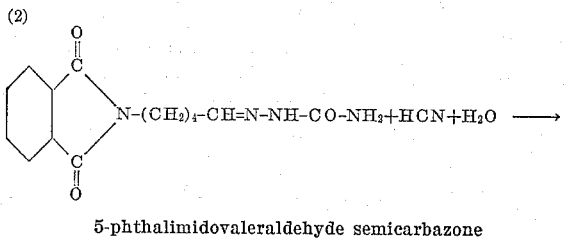

5-phthalimidovaleraldehyde semicarbazone

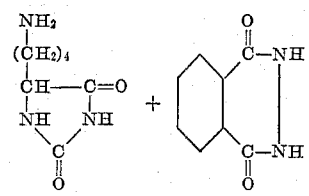

5-(4-aminobutyl)-hydantoin phthalhydrazide

The reaction to produce the phthalimidovaleraldehyde semicarbazone is effected by heating 5-chloro- or 5-bromovaleraldehyde semicarbazone with a salt of phthalimide or with a mixture of phthalimide and a base. Examples of such bases are the alkali metal, the alkaline earth metal and the quaternary ammonium carbonates and hydroxides. It is preferred to carry out the reaction in an inert liquid reaction medium. Examples of such media are water, ethers, such as dimethyl and diethyl ether; ether alcohols, such as ethyleneglycol monomethylether; a lower aliphatic alcohol, such as methanol, ethanol, the propanols and the butanols; hydrocarbons such as toluene, the xylenes and heptane; and dimethyl formamide. Temperatures of about 50 to 200° C. can be used; the preferred temperatures range from 90 to 150° C. Either reactant can be employed in considerable excess, but in order not to be wasteful of either it is preferred to avoid excesses greater than about 10% of either reactant. Use of the reactants in substantially equimolar proportions is most preferred.

The product phthalimidovaleraldehyde semicarbazone can be recovered from the reaction mixture by conventional methods. A simple recovery method involves diluting the reaction mixture with water to precipitate the product, which is a solid melting at about 160–163° C. Recovery of the product from the reaction mixture may not be necessary, depending upon the use intended. Thus, the reaction mixture can be used directly to prepare 5-(4-aminobutyl)-hydantoin.

The phthalimide salt employed in reaction (1) can be any salt of phthalimide and an alkali metal, an alkaline earth metal or a quaternary ammonium base. The alkali metal salts, particularly the sodium and potassium salts, are preferred. Examples of the alkaline earth metal salts are the calcium, barium and magnesium salts. Suitable salts of quaternary ammonium bases are those of tetramethyl ammonium hydroxide, trimethylethyl ammonium hydroxide, tetraethyl ammonium hydroxide, benzyltrimethyl ammonium hydroxide, trimethylphenyl ammonium hydroxide, and methyl pyridinium hydroxide.

Reaction (2) to produce 5-(4-aminobutyl)-hydantoin can be carried out by reacting the phthalimidovaleraldehyde semicarbazone with hydrogen cyanide and water under any of the reaction conditions which are generally suitable for converting aldehydes or ketones to the corresponding hydantoins by reaction with cyanide, ammonium and carbonate ions. The reaction should be carried out in an inert polar solvent, preferably water (which is also a reactant), a lower (e.g. a 1–4 carbon) aliphatic alcohol, or a mixture of such solvents. At least 1 mole of hydrogen cyanide and 1 mole of water should be used per mole of phthalimidovaleraldehyde semicarbazone. It generally will not be economical to employ more than about 1.5 moles of hydrogen cyanide per mole of the semicarbazone, but a considerable excess of water, e.g. 5 to 100 moles or more per mole of the semicarbazone, is usually preferred.

Reaction (2) is most preferably carried out in the presence of carbonate and ammonium ions, convenient sources of which are ammonia, ammonium hydroxide, ammonium carbonate, carbon dioxide, and the alkali metal carbonates and bicarbonates. When using carbon dioxide or ammonium carbonate as the source of carbonate ions, the combination of carbon dioxide or ammonium carbonate with an alkali metal cyanide such as sodium cyanide can be employed to produce in situ the hydrogen cyanide required for the reaction. Generally suitable proportions are 1 to 10 moles of carbonate ions and 2 to 20 moles or more of ammonium ions per mole of the phthalimidovaleraldehyde semicarbazone.

Suitable temperatures for carrying out reaction (2) range from 40 to 220° C. Operation under pressure will be required at the higher temperatures indicated. The preferred temperatures range from 60 to 150° C. The reaction is usually completed in about 3 to 4 hours at 100° C., and in shorter times at higher temperatures.

It has previously been proposed to react certain aldehyde semicarbazones with hydrogen cyanide and ammonium carbonate to obtain hydantoins corresponding to the aldehydes of the semicarbazones used, e.g., 5-(n-propyl)-hyantoin from n-butyraldehyde semicarbazone. In contrast, the present hydantoin-forming reaction yields 5-(4-aminobutyl)-hydantoin instead of 5-(4-phthalimidobutyl)-hydantoin which would have been expected to be obtained from the starting phthalimidavaleraldehyde semicarbazone. In other words, the present hydantoin-forming reaction involves the simultaneous formation of the hydantoin ring and the substitution of the terminal phthalimido group by an amino group. This very desirable result was entirely unexpected.

The invention is illustrated by Examples 1 and 2. The 5-chlorovaleraldehyde semicarbazone used in Example 1 was prepared as follows:

A glass-lined rocker reaction bomb was charged with 5-chlorovaleronitrile (35 g., 0.3 mole), semicarbazide hydrochloride (33.5 g., 0.3 mole), sodium acetate trihydrate (54.5 g., 0.4 mole), Raney nickel (settled slurry in water, equivalent to about 25 g. Ni) and aqueous ethanol (290 cc., 60% ethanol by volume). The bomb was purged with hydrogen, then pressured with hydrogen to a pressure of 1520 p.s.i.g. The hydrogen pressure dropped 130 p.s.i. during 46 min. at room temperature, following which the bomb was re-pressured with hydrogen to 1530 p.s.i.g. The pressure dropped an additional 30 p.s.i. over the next 34 min. and thereafter remained constant. The catalyst was filtered off and washed first with ethanol, then with water. The filtrate and washings were evaporated on the steam bath under reduced pressure to about 150 cc. 5-chlorovaleraldehyde semicarbazone separated from the resulting mixture as a liquid layer which crystallized readily when cooled and scratched. After standing overnight, the crystals were filtered off and dried in a vacuum oven. After recrystallizing from isopropanol, the 5-chlorovaleraldehyde semicarbazone product melted at 94–96° C.

5-bromovaleraldehyde semicarbazone can be prepared by using 5-bromovaleronitrile instead of the corresponding chloro-compound in the above method.

Example 1

5-chlorovaleraldehyde semicarbazone (150 g., 0.084 mole, potassium phthalimide (15.6 g., 0.084 mole) and ethyleneglycol monomethylether (200 cc.) were mixed and heated under reflux with stirring for 20 hrs. The resulting mixture contained 0.067 mole of chloride ion (80% of theoretical amount for complete reaction). It was mixed with 500 cc. of water whereby the product 5-phthalimidovaleraldehyde semicarbazone (11 g., 45% yield based on materials charged) was precipitated. After recrystallization from methanol, ethanol and isopropanol successively, is melted at 160–163° C. and analyzed: C, 58.70, 58.79%; H, 5.38, 5.58%; N, 19.72%. Calculated for $C_{14}H_{16}O_3N_4$: C, 58.32%; H, 5.59%; N, 19.43%.

Example 2

A charge of 5-phthalimidovaleraldehyde semicarbazone (6.9 g., 0.024 mole), sodium cyanide (1.4 g., 0.027 mole), ammonium carbonate (3.8 g., 0.024 mole), ethanol (50 cc.) and water (25 cc.) was heated at 90° C. in a sealed Carius tube for 12 hrs. The resulting solution was evaporated on the steam bath under reduced pressure. The residue was dissolved in water and acidified with hydrochloric acid. The solid precipitate formed was shown by analysis to be phthalhydrazide. The filtered solution was treated with excess hydrochloric acid and evaporated to dryness. The resulting residue (6.3 g.) was extracted with 35 cc. of boiling 95% ethanol and the solution filtered to remove sodium chloride. Addition of acetone (200 cc.) to the filtrate caused formation of a gummy precipitate which hardened on standing. This was redissolved in 95% ethanol and reprecipitated with acetone to give a product (1.0 g.) which was shown by paper chromatography to be about half 5-(4-aminobutyl)-hydantoin.

The present invention provides a way of making 5-phthalimidovaleraldehyde semicarbazone and a method for converting it to 5-(4-aminobutyl)-hydantoin which is a valuable lysine intermediate.

The embodiments of the invention in which an exclusive property or privilege is claimed are defined as follows:

1. The method of producing 5-(4-aminobutyl)hydantoin comprising reacting a compound of the group consisting of the semicarbazones of 5-chlorovaleraldehyde and 5-bromovaleraldehyde with a phthalamide salt of a base of the group consisting of the alkali metal bases, the alkaline earth metal bases and those quaternary ammonium bases of the group consisting of tetramethyl ammonium hydroxide, trimethylethyl ammonium hydroxide, tetraethyl ammonium hydroxide, benzyltrimethyl ammonium hydroxide, trimethylphenyl ammonium hydroxide and methylpyridinium hydroxide, and reacting the resulting 5-phthalimidovaleraldehyde semicarbazone with hydrogen cyanide and water.

2. The method of claim 1 wherein the reaction involving the salt of phthalimide is effected at a temperature of 50 to 200° C. in an inert liquid reaction medium, and the reaction involving 5-phthalimidovaleraldehyde semicarbazone is effected at a temperature of 40 to 220° C. in an inert polar solvent.

3. The method of claim 2 wherein the reaction involving 5-phthalimidovaleraldehyde semicarbazone is carried out in the presence of carbonate and ammonium ions.

4. The method of producing 5-(4-aminobutyl)-hydantoin comprising reacting 5-phthalimidovaleraldehyde semicarbazone with hydrogen cyanide and water.

5. The method of claim 4 wherein the reaction is effected at a temperature of 40 to 220° C.

6. The method of claim 4 wherein the reaction is effected in the presence of ammonium and carbonate ions.

7. The method of producing 5-(4-aminobutyl)-hydantoin comprising reacting 5-phthalimidovaleraldehyde semicarbazone with hydrogen cyanide and water at 40 to 220° C. employing 1 to 1.5 moles of hydrogen cyanide and 5 to 100 moles of water per mole of said semicarbazone, said reaction being carried out in the presence of 1 to 10 moles of carbonate ions and 2 to 20 moles of ammonium ions per mole of said semicarbazone.

8. The method of claim 7 wherein the reaction is carried out at a temperature of 60 to 150° C.

References Cited in the file of this patent

UNITED STATES PATENTS

| | | |
|---|---|---|
| 2,564,649 | Rogers | Aug. 14, 1951 |
| 2,729,645 | Klopping | Jan. 3, 1956 |
| 2,937,184 | Coker et al. | May 17, 1960 |

OTHER REFERENCES

Jambresic: Chem. Abstracts, vol. 49, col. 230 (1955).
Balenovic: Chem. Abstracts, vol. 50, col. 11978 (1956).